(12) United States Patent
Fuss

(10) Patent No.: US 8,229,347 B2
(45) Date of Patent: Jul. 24, 2012

(54) BASE TRANSCEIVER STATIONS AND METHOD OF OPERATING THEREOF

(75) Inventor: Michael Johannes Fuss, Allmersback Im Tal (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 328 days.

(21) Appl. No.: 12/304,708

(22) PCT Filed: Jun. 14, 2006

(86) PCT No.: PCT/EP2006/063221
§ 371 (c)(1),
(2), (4) Date: Nov. 19, 2009

(87) PCT Pub. No.: WO2007/144022
PCT Pub. Date: Dec. 21, 2007

(65) Prior Publication Data
US 2010/0056205 A1    Mar. 4, 2010

(51) Int. Cl.
*H04H 20/74* (2008.01)

(52) U.S. Cl. .................................. 455/3.04; 455/561

(58) Field of Classification Search .............. 455/3.04, 455/3.06, 561, 562.1
See application file for complete search history.

(56) References Cited

U.S. PATENT DOCUMENTS

| | | | |
|---|---|---|---|
| 6,411,825 B1 * | 6/2002 | Csapo et al. ............. 455/561 |
| 7,839,776 B2 * | 11/2010 | Bi et al. .................. 370/230 |
| 2001/0031646 A1 | 10/2001 | Williams |
| 2002/0136286 A1 * | 9/2002 | Koo ....................... 375/225 |
| 2003/0036410 A1 | 2/2003 | Judd et al. |
| 2003/0109217 A1 * | 6/2003 | Reed et al. ............ 455/3.05 |
| 2004/0192219 A1 * | 9/2004 | Malone et al. ........... 455/73 |
| 2005/0009471 A1 * | 1/2005 | Paul et al. ............ 455/161.1 |

* cited by examiner

*Primary Examiner* — Lana N Le
(74) *Attorney, Agent, or Firm* — Coats & Bennett, P.L.L.C.

(57) ABSTRACT

A base transceiver station (202) for use in a wireless telecommunications system comprising at least one radio transceiver of a first type connected to an antenna of a first type (108) for providing wireless access for remote subscriber units (114) and a radio transceiver of a second type connected to an antenna of a second type (206). The radio transceivers of the first type are operably connected via cables (208), in an intermediate 10 frequency domain, to the transceiver of the second type.

27 Claims, 5 Drawing Sheets

BASE TRANSCEIVER STATIONS AND METHOD OF OPERATING THEREOF

FIELD OF THE INVENTION

The present invention relates to wireless telecommunications, in general, and in particular to base transceiver stations and method of operating thereof.

BACKGROUND OF THE INVENTION

Base transceiver stations, known in the art and illustrated 102 in FIG. 1, are used for example in Universal Mobile Telecommunications System (UMTS), where they are known as Node Bs. Node B consists of an indoor equipment or indoor units (IDUs), 104 in form of a shelf with cards for controller units and radio intermediate frequency units (one set of these is required per carrier), Asynchronous Transfer Mode (ATM) switching units etc., and an outdoor equipment or outdoor units (ODUs) 108 for the mobile radio connectivity, i.e. radio transceivers and sector antennas, e.g. for 120° sectorization, connected to each other by means of intermediate-frequency (IF) cables 116. There are also known in the art other sectorizations e.g. 1×360° (omnidirectional). The maximum data rate of UMTS carriers with 5 MHz bandwidth is in the order of 2-15 Mbit/s dependent on the implemented UMTS technology, e.g. R'99, High Speed Downlink Packet Access (HSDPA) or even more in the future. The data traffic from UMTS frequency carriers is aggregated in the Asynchronous Transfer Mode (ATM) switch integrated in the indoor unit 104 using statistical multiplexing gain for bursty traffic profiles in order to reduce the required backhaul capacity. However, when in UMTS system the Wideband-Code-Division Multiple Access (W-CDMA) air interface is highly utilised, i.e. the statistical multiplexing gain is low, the maximum required backhaul capacity for a 2×5 MHz carrier Node B consisting of 3×120° sectors will be in the order of 84 Mbit/s, i.e. 6×14 Mbit/s (there are two carriers of 5 MHz bandwidth each in one 120° sector). In this situation there is no big potential for further multiplexing gain. This traffic can be transported to a radio network controller (RNC) or the next ATM aggregation node by a fixed radio point-to-point (PtP) system (or by a fixed radio point-to-multipoint (PmP) system) consisting of an indoor unit (IDU) 106 and outdoor unit (ODU) 120 with a directional antenna on the base station side to another directional antenna 112 on the other side of the link 110 connected to a corresponding IDU (not shown).

Apart from the ineffective, in some cases, statistical multiplexing another disadvantage of the solutions known in the art is that the indoor equipment at the base transceiver station requires either a telecommunications room, which is rented in most cases, or a shelter on the roof including air conditioning etc. Cables have to be mounted between indoor and outdoor equipment. For repair and maintenance activities service staff has to travel to these sites, which are fairly distributed in the service area, in order to achieve sufficient coverage and capacity and this is very expensive.

Hence, an improved base transceiver station would be advantageous and in particular one that does not require indoor equipment.

SUMMARY OF THE INVENTION

Accordingly, the invention seeks to preferably mitigate, alleviate or eliminate one or more of the disadvantages mentioned above singly or in any combination.

According to a first aspect of the present invention there is provided a base transceiver station for use in a wireless telecommunications system.

The base transceiver station for use in a wireless telecommunications system according to the first aspect of the present invention, comprises at least one radio transceiver of a first type connected to an antenna of a first type and a radio transceiver of a second type connected to an antenna of a second type. The at least one radio transceiver of the first type is for providing wireless access for remote subscriber units, is operably connected via cables, in an intermediate frequency domain, to the transceiver of the second type.

Preferably the base transceiver station comprises a carrier combiner unit adapted to combine frequency carriers used by the transceivers of the first type into one transport channel used by the transceiver of the second type. The carrier combiner unit is built-in in the transceiver of the second type or alternatively is a separate unit receiving input from the transceivers of the first type and providing output to the transceiver of the second type.

Also preferably the carrier combiner unit is adapted to shift frequency of the carriers used by the transceivers of the first type with a different shift for each one of said carriers. The frequency shift introduced by the carrier combiner for i-th carrier is $(i-1)\cdot df$, where $i=1 \ldots n$ and n is the number of carriers to be combined and df is a basic frequency shift.

Preferably df is at least the width of the frequency carrier used by the transceivers of the first type.

The radio transceiver of the second type of the base transceiver station according to the first aspect of the present invention is adapted to transmit and receive a signalling channel within the transport channel to provide information concerning point-to-point or point-to-multipoint radio power control and carrier/noise ratio to trigger an adaptive modulation. Preferably both types of radio transmitters are adapted to use separate transmission power control.

In the base transceiver station according to the first aspect of the present invention the radio transceiver of the second type is adapted to operate in point-to-point mode or as a terminal in point-to-multipoint mode, or in a meshed type mode.

According to a second aspect of the present invention there is provided a wireless telecommunications system.

The wireless telecommunications system according to the second aspect of the present invention, comprises a plurality of base transceiver stations, each serving plurality of remote subscriber units, at least one Radio Network Controller adapted to control several base transceiver stations, wherein each one of at least part of said base transceiver stations comprises at least one radio transceiver of a first type connected to an antenna of a first type for providing wireless access for said remote subscriber units and a radio transceiver of a second type connected to an antenna of a second type, wherein the at least one radio transceiver of the first type is operably connected via cables, in an intermediate frequency domain, to the transceiver of the second type.

According to a third aspect of the present invention there is provided a method of operating a base transceiver station.

The method of operating a base transceiver station serving plurality of remote subscriber units in a wireless telecommunications system according to the third aspect of the present invention is disclosed below. Said base transceiver station comprises at least one radio transceiver of a first type connected to an antenna of a first type for providing wireless access for said remote subscriber units and a radio transceiver of a second type connected to an antenna of a second type. The transceiver of the first type performs the following steps of the method: down-converting radio-frequency signals to be transmitted to the transceiver of the second type into intermediate-frequency signals and up-converting intermediate frequency signals received from the transceiver of the second type into radio-frequency signals. The transceiver of the second type performs the following steps of the method: down-converting radio-frequency signals to be transmitted to the transceiver of the first type into intermediate-frequency signals and up-converting intermediate frequency signals received from the transceiver of the first type into radio-frequency signals. The signals are transmitted via at least one cable connecting the transceivers of the first and second types.

The method preferably comprises a step of combining frequency carriers used by the transceivers of the first type into one transport channel used by the transceiver of the second type. In the step of combining of the frequency carriers, shifting of frequency of the carriers used by the transceivers of the first type with a different shift for each one of said carriers is performed. The frequency shift for i-th carrier is $(i-1) \cdot df$, where $i=1 \ldots n$ and n is the number of carriers to be combined and df is a basic frequency shift. Preferably df is at least the width of the frequency carrier used by the transceivers of the first type.

In the method according to the third aspect of the present invention the radio transmitter of the second type transmits and receives a signalling channel within the transport channel to provide information concerning point-to-point or point-to-multipoint radio power control and carrier/noise ratio to trigger an adaptive modulation. Preferably both types of radio transmitters use separate transmission power control.

Further features of the present invention are as claimed in the dependent claims.

The present invention beneficially allows for reduction of capital expenditures for the base transceiver station site (no indoor equipment required) and some functions of the base transceiver station can be centralised and serve several base transceiver stations. In addition, operational expenditures for site related functions (e.g. rental, power, repair and maintenance) can be reduced.

BRIEF DESCRIPTION OF THE DRAWINGS

The present invention will be understood and appreciated more fully from the following detailed description taken in conjunction with the drawings in which.

DESCRIPTION OF EMBODIMENTS OF THE INVENTION

Figure 1:
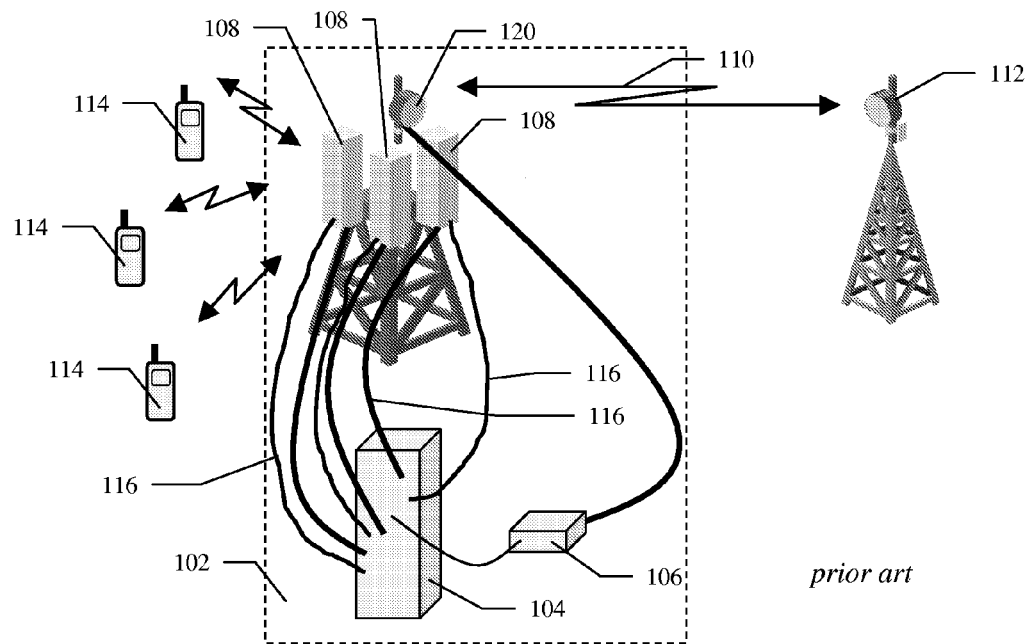
FIG. 1 is a diagram illustrating a base transceiver station known in the art deployed in a wireless telecommunications system.
Figure 2:
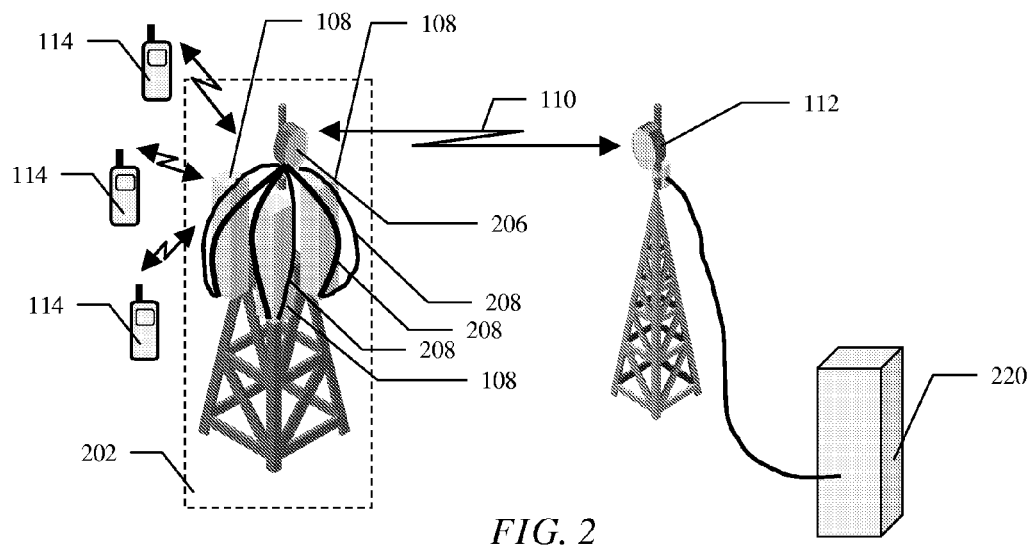
FIG. 2 is a diagram illustrating a base transceiver station in one embodiment of the present invention deployed in a wireless telecommunications network.

With reference to FIG. 2 a base transceiver station 202 for use in a wireless telecommunications system with three sector antennas 108, each serving one 120°-sector and each providing two frequency carriers on uplink and two on downlink is shown. In order to provide two frequency carries in each of the sectors six transceivers of a first type (e.g. W-CDMA transceivers) are used (two transceivers connected to one 120° sector antenna). Spectrum of the signal transmitted and received by one of these W-CDMA transceivers might be identical to spectrum of the other transceivers. It is clearly illustrated in FIG. 4, where each horizontal axis corresponds to one transceiver and shows two separated 5 MHz channels one of which is used for transmission towards the base transceiver station (uplink) and one is used for transmission from the base transceiver station (downlink). Each one of these transceivers is connected to an antenna 108. In one embodiment two transceivers are connected to one sector antenna that is adapted to transmit/receive signals on two frequency carriers, i.e. uplink and downlink in FDD. If the W-CDMA carrier is using TDD—Time Division Duplex and there is only one frequency carrier allocated. This is sufficient for the PtP/PmP backhaul radio link as well. In an alternative embodiment each one of these six W-CDMA transceivers is connected to a separate sector antenna. The base transceiver station also comprises an antenna and a transceiver of a second type—in one embodiment it is a transceiver and an antenna operating in point-to-point mode. In alternative embodiments the antenna and transceivers of the second type can operate as terminal in point-to-multipoint mode or in a meshed type mode. The six W-CDMA transceivers are connected by means of six coaxial cables 208 to the PtP radio transceiver (not shown in FIG. 2, but in one embodiment it can be integrated with the parabolic antenna 206).

Figure 3:
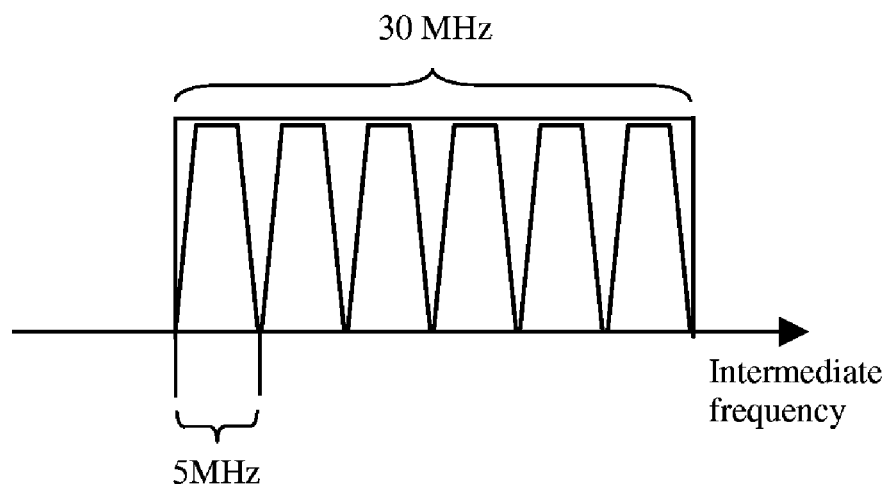
FIG. 3 is a schematic illustration of multiple frequency carriers combined in one transport channel in accordance with embodiment of the present invention.

Six W-CDMA carriers, each having bandwidth of 5 MHz, are combined in intermediate frequency domain as shown in FIG. 3 to fit into one 30 MHz transport channel. This channel is transmitted transparently over the PtP radio link 110. Because signals from these six carriers are transmitted via cables 208 to the transceiver of PtP radio link where they are combined into one 30 MHz channel without complex statistical multiplexing it is no longer required to have the indoor equipment deployed at the location of the base transceiver station 202. The indoor equipment 220 for the base transceiver station 202 is deployed on a centralised location in the network and is shared by several base transceivers stations, and the indoor equipment for the PtP radio link is not required.

Figure 4:
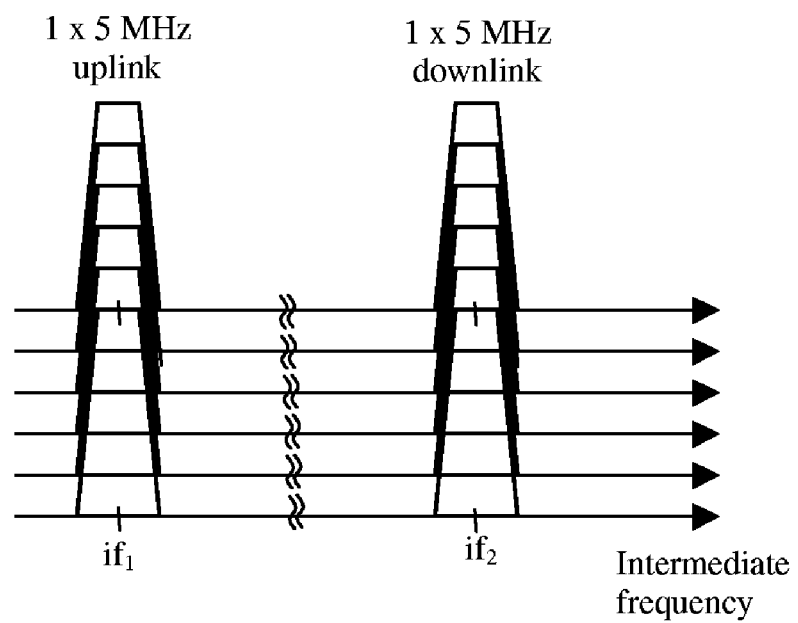
FIG. 4 is a schematic illustration of multiple frequency carriers, before combining, transmitted from sector transceivers to a point-to-point fixed radio system in accordance with embodiment of the present invention.

In one embodiment the combining is carried out in a frequency carrier combiner unit (e.g. frequency multiplexer) that is part of the point-to-point radio transceiver. In this embodiment six W-CDMA transceivers can be connected in the intermediate frequency domain via six coaxial cables to the PtP transceiver providing six IF inputs. On each one of these six coaxial cables a signal with a spectrum according to FIG. 4 is transmitted. Alternatively the frequency multiplexer can be deployed as a separate device (outdoor device) and connected using six coaxial cables to the six W-CDMA transceivers and with one coaxial cable to the PtP radio transceiver.

It is, however, within contemplation of the present invention that alternative methods of combining of the carriers can be deployed without the need for undue experimentation.

Figure 6:
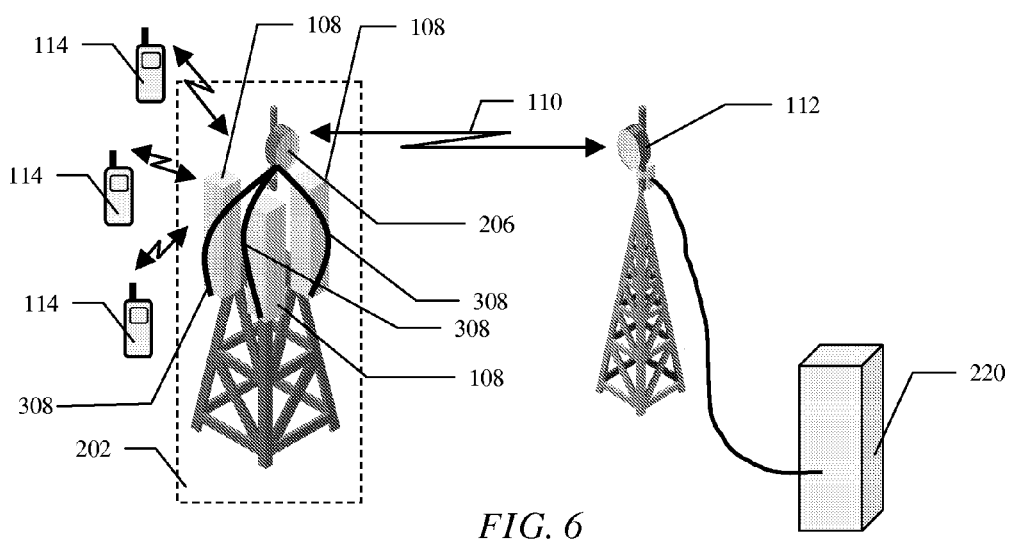
FIG. 6 is a diagram illustrating a base transceiver station in one embodiment of the present invention deployed in a wireless telecommunications network.
Figure 7:
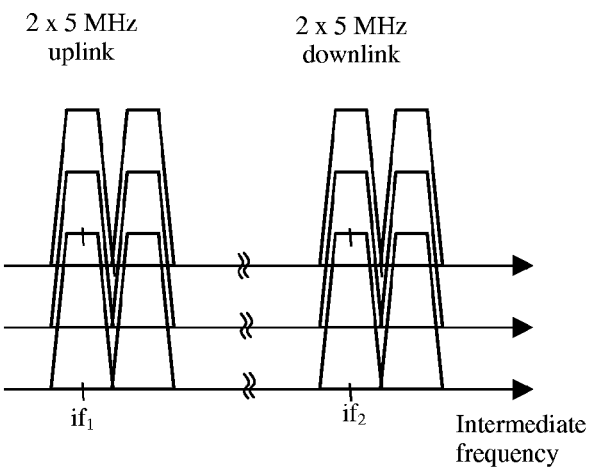
FIG. 7 is a schematic illustration of multiple frequency carriers, before combining, transmitted from sector transceivers to a point-to-point fixed radio system in accordance with embodiment of the present invention.

In an alternative embodiment illustrated in FIG. 6 a base transceiver station 202 for use in a wireless telecommunications system comprises three sector antennas 108, each serving one 120°-sector and each providing two frequency carriers on uplink and two on downlink. However, in order to provide two frequency carries in each of the sectors three transceivers of the first type (e.g. W-CDMA transceivers) are used. Each of the three transceivers uses 2×5 MHz carriers separated from each other. An example of a spectrum used in this embodiment is illustrated in FIG. 7. In this embodiment one transceiver is connected to one 120° sector antenna. Spectrum of the signal transmitted and received by one of these W-CDMA transceivers might be identical to spectrum of the other transceivers. It is clearly illustrated in FIG. 7, where each horizontal axis corresponds to one transceiver and shows two separated groups of two 5 MHz carriers. One of these groups is used for transmission towards the base transceiver station (uplink) and one is used for transmission from the base transceiver station (downlink). Each one of these transceivers is connected to one sector antenna 108. The base transceiver station also comprises an antenna of a second type 120 and a transceiver of a second type (not shown)—in one embodiment it is a transceiver and an antenna operating in point-to-point mode. In alternative embodiments the antenna and transceivers of the second type can operate as terminal in point-to-multipoint mode or in a meshed type mode. The three W-CDMA transceivers are connected by means of three coaxial cables 308 to the PtP radio transceiver. In one embodiment the PtP radio transceiver can be integrated with the parabolic antenna 206.

Three W-CDMA carriers, each having bandwidth of 10 MHz (as shown in FIG. 7 this 10 MHz carrier comprises two 5 MHz channels), are combined in intermediate frequency domain to fit into one 30 MHz transport channel as shown in FIG. 3. This channel is transmitted transparently over the PtP radio link 110. As described in the embodiment above, because signals from these three carriers are transmitted via cables 308 to the transceiver of transport radio link without complex statistical multiplexing it is no longer required to have the indoor equipment deployed at the location of the base transceiver station 202.

In one embodiment the combining is carried out in a carrier combiner unit (e.g. frequency multiplexer) that is part of the point-to-point radio transceiver. In this embodiment three W-CDMA transceivers can be connected in the intermediate frequency domain via three coaxial cables to the PtP transceiver providing three IF inputs. On each one of these three coaxial cables a signal with a spectrum according to FIG. 7 is transmitted. Alternatively the frequency multiplexer can be deployed as a separate device (outdoor device) and connected using three coaxial cables to the three W-CDMA transceivers and with one coaxial cable to the PtP radio transceiver.

The point-to-point radio transceiver is adapted to transmit and receive a signalling channel within the transport channel 110 in order to obtain information concerning point-to-point or point-to-multipoint radio power control and carrier/noise ratio to trigger an adaptive modulation. A control unit 220 for the automatically adaptive modulation (carrier/noise (C/N) measurement) must consider the W-CDMA radio interface as well as the PtP radio interface. Either of the radio interfaces determines the level of used modulation. For both radio interfaces a separate power control instance is required. Since the PtP radio does not perform any traffic processing the transport delay can be neglected with regard to remote control of the W-CDMA air interface.

Figure 5:
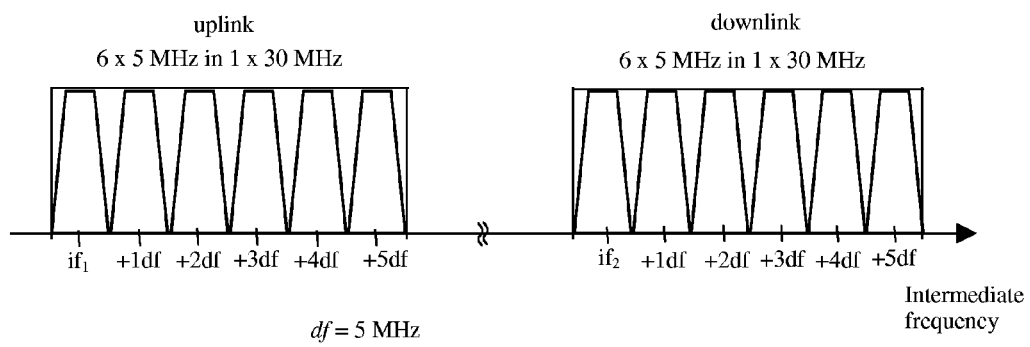
FIG. 5 is a schematic illustration of multiple uplink and downlink carriers combined into two transport channels in a point-to-point fixed radio system, i.e. uplink and downlink by using Frequency Division Duplex, in accordance with embodiment of the present invention.

The carrier combiner unit is adapted to shift frequency of the carriers used by the W-CDMA transceivers with a different shift for each one of said carriers. Five of the six W-CDMA carriers are shifted in frequency independently. The frequency shift Df for i-th carrier is $(i-1) \cdot df$, where i= 1 . . . n and n is the number of carriers to be combined into one transport channel and df is a basic frequency shift. It is, however, within contemplation of the present invention that the carriers combined in one transport channel do not necessarily need to be equally separated with frequency shift being multiple of df. It is illustrated in FIG. 5 where if$_1$ is a center frequency in intermediate frequency domain of the uplink signal transmitted and/or received by a first of the six W-CDMA transceivers. Using the above formula $$Df_1 = (i-1) \cdot df$$

and for i=1

$$Df_1 = 0 \cdot df = 0$$

Same, simple calculation for transceiver number 5 (i=5) of the six W-CDMA transceivers gives:

$$Df5 = (i-1) \cdot df = 4df$$

In a preferred embodiment df is at least the width of the frequency carrier used by the transceivers of the first type, which in the example of W-CDMA is 5 MHz. Alternatively, however, df is less then the width of the frequency carrier used by the transceivers of the first type.

Figure 8:
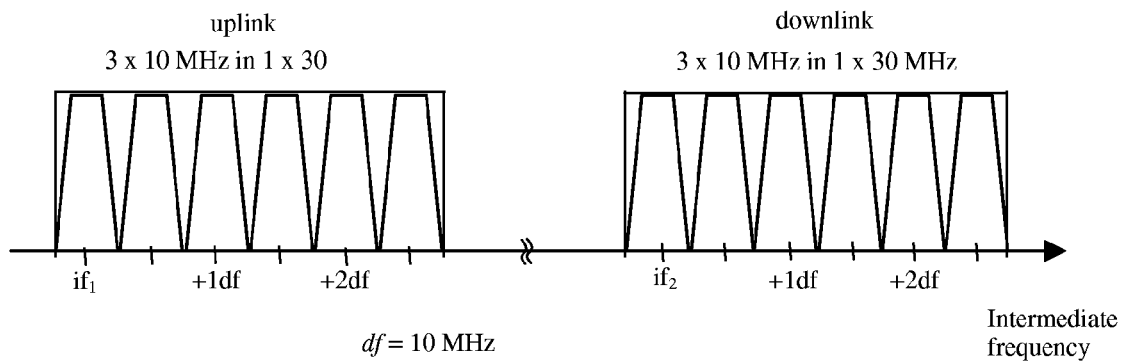
FIG. 8 is a schematic illustration of multiple uplink and downlink carriers combined into two transport channels in a point-to-point fixed radio system, i.e. uplink and downlink by using Frequency Division Duplex, in accordance with embodiment of the present invention.

In the another embodiment described above where 2×5 MHz carriers are combined already but separated from each other by a frequency shift of 5 MHz and transmitted by one W-CDMA transceiver with an antenna of 120° sectorization, df is required to be 10 MHz with i=1 . . . 3 as illustrated in FIG. 8.

Afterwards all six signals are added (combined) and the resulting 30 MHz carrier is transported transparently over the PtP system. FIG. 5 and FIG. 8 show two groups of W-CDMA carriers combined in two 30 MHz channels in PtP radio system. One of these channels is for uplink and the other one for downlink.

The point-to-point radio transceiver is adapted to transmit and receive a signalling channel within the transport channel to provide information concerning point-to-point or point-to-multipoint radio power control and carrier/noise ratio to trigger an adaptive modulation.

Although the embodiments described above were based on an example where the bandwidth of the transport channel was natural multiple of the bandwidth of the carriers used for communication between the base transceiver station and the mobile terminal (6×5 MHz=30 MHz or 3×10 MHz=30 MHz) it is within contemplation that the present invention is equally applicable to other frequency allocations.

Transport channel allocations of 30 MHz are used e.g. in South America and also other channels as 40 or 50 MHz are used at certain frequencies in North America, i.e. there are many different options used by the frequency regulation authorities in different countries. 30 MHz transport channel allocations are also used in Local Multipoint Distribution Service (LMDS).

As mentioned above the invention can be also applied to other frequency allocations, like the one commonly used in Europe, where for fixed radio services, which are applied depending on national frequency regulation, for backhauling of W-CDMA base stations 28 MHz transport channel frequency allocation is used. It is of course possible to combine five carriers 5 MHz wide each into 28 MHz. When it is necessary to combine six carriers 5 MHz wide each into one 28 MHz transport channel, df (basic frequency shift) is less then 5 MHz (the width of the frequency carrier used by the transceivers of the first type). In this case the six carries will overlap slightly, when combined in the transport channel. In the embodiment, when the carriers are combined with slight overlapping it is necessary to apply certain decoupling techniques known in the art in order to separate the carriers, but the decoupling techniques are not the subject matter of the present invention.

Although the present embodiment is based on the example of W-CDMA it is within contemplation of the present invention that the solution as hereby defined can be easily applied also to GSM, GPRS, HSCSD, CDMA2000, EV-DO, WiMAX or other point-to-point, or point-to-multipoint fixed radio system.

Similarly, although the present embodiment is based on the example of multi-sector antennas, it is within contemplation of the present invention that the solution is equally applicable to base stations where one sector covers 360° area. In these types of embodiments one sector/antenna is required to be directed over the area of interest. Within the allocated spectrum for UMTS there is a certain frequency band dedicated to TDD transmission usable for so-called Pico nodes with one transceiver connected to a 360° (omni-directional) antenna, mainly for in-house application, e.g. Internet connectivity in a larger office, public building etc. Time Division Duplex gives the advantage that uplink and downlink do not have to be symmetrical but can share the time or capacity for transmission as required. For these single transceiver applications the invention is beneficial as well since no IDU equipment is required. Because there is only one carrier of the mobile base station to be transported over the point-to-point or point-to-multipoint radio feeder the signals in the intermediate frequency domain has to be matched to each other, no frequency shifting and combining was required because only one carrier has to be transported and for the PtP/PmP radio feeder a smaller frequency channel would be sufficient, e.g. 5 or 10 MHz (or 28/4=7 or 28/2=14 MHz).

Figure 9:
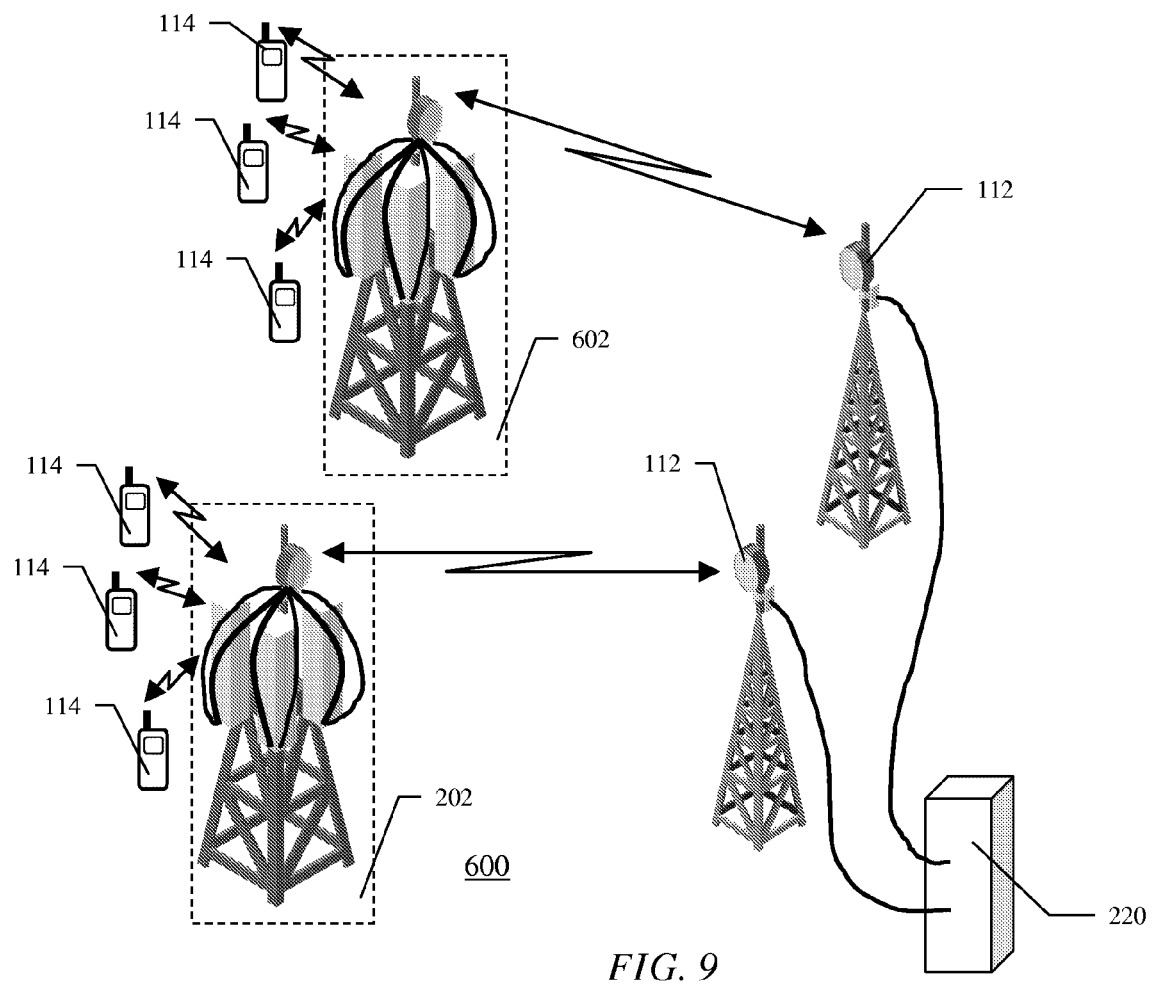
FIG. 9 is a schematic illustration of a wireless telecommunications network in accordance with embodiment of the present invention.

With reference to FIG. 9 a wireless telecommunications system 600 in accordance with one embodiment of the present invention is described herein below. The benefit of this solution is that the base transceiver station 202 does not require any indoor equipment at the site of deployment and some of the functions, which cannot be provided by the outdoor equipment are provided by a centralised indoor equipment 220 that serves plurality of base transceiver stations 202, 602 each serving plurality of remote subscriber units 114. The telecommunications system further comprises a Radio Network Controller (not shown) adapted to control several base transceiver stations. In one embodiment each one of at least part of said base transceiver stations comprises at least one W-CDMA radio transceiver connected to a sector antenna for providing wireless access for said remote subscriber units 114, wherein the W-CDMA radio transceivers are operably connected via cables 208, in an intermediate frequency domain, to the radio transceiver operating in point-to-point mode.

In operation, in the W-CDMA transceiver, the following operations are performed:

down-conversion of radio-frequency signals to be transmitted to the point-to-point radio transceiver into intermediate-frequency signals;

up-conversion of intermediate frequency signals received from the point-to-point transceiver into radio-frequency signals.

In the point-to-point transceiver, in turn, the following operations are performed:

down-conversion radio-frequency signals to be transmitted to the W-CDMA transceiver into intermediate-frequency signals;

up-conversion of intermediate frequency signals received from the W-CDMA transceiver into radio-frequency signals.

The signals are transmitted between the W-CDMA and point-to-point transceivers via coaxial cables 208 connecting the transceivers, wherein one separate cable is used to connect one W-CDMA transceiver to the point-to-point transceiver.

In a preferred embodiment the method of operating wireless communications network comprises the step of combining frequency carriers used by the W-CDMA transceivers into one transport channel used by the point-to-point transceiver. Further in the step of combining the W-CDMA carriers into one transport channel the frequency of the W-CDMA carriers transmitted via the coaxial cables is shifted with a different shift for each one of said W-CDMA carriers. In one embodiment the frequency shift for i-th carrier is $Df_i=(i-1)\cdot df$, where $i=1 \ldots n$ and n is the number of carriers to be combined and df is a basic frequency shift.

The invention claimed is:

1. A base transceiver station for use in a wireless telecommunications system, the base transceiver station comprising:
one or more radio transceivers of a first type connected to one or more antennas of a first type configured to provide wireless access for remote subscriber units;
a radio transceiver of a second type connected to an antenna of a second type; and
a cable connecting the one or more radio transceivers of the first type to the transceiver of the second type in an intermediate frequency domain; and
a carrier combiner unit configured to:
combine frequency carriers used by the one or more radio transceivers of the first type into one transport channel used by the transceiver of the second type; and
shift a frequency of the carriers used by the one or more radio transceivers of the first type with a different shift for each carrier, wherein the frequency shift for an i-th carrier is $(i-1)\cdot df$, wherein $i=1 \ldots n$, and n is the number of carriers to be combined, and wherein df is a basic frequency shift that is at least a width of the carrier frequency used by the one or more radio transceivers of the first type.

2. The base transceiver station of claim 1 wherein the carrier combiner unit is built into the transceiver of the second type.

3. The base transceiver station of claim 1 wherein the carrier combiner unit comprises an independent unit configured to receive input from the one or more radio transceivers of the first type, and to provide output to the transceiver of the second type.

4. The base transceiver station of claim 1 wherein df is less than a width of the carrier frequency used by the one or more radio transceivers of the first type.

5. The base transceiver station of claim 1 wherein the radio transceiver of the second type is configured to transmit and receive a signaling channel within a transport channel to provide information concerning point-to-point or point-to-multipoint radio power control, and carrier/noise ratio, to trigger an adaptive modulation.

6. The base transceiver station of claim 1 wherein both the first and second types of radio transceivers are configured to use separate transmission power control.

7. The base transceiver station of claim 1 wherein the radio transceiver of the second type is configured to function in a point-to-point mode.

8. The base transceiver station of claim 1 wherein the radio transceiver of the second type is configured to function as a terminal in a point-to-multipoint mode.

9. The base transceiver station of claim 1 wherein the radio transceiver of the second type is adapted to operate in a meshed type mode.

10. The base transceiver station of claim 1 wherein the one or more radio transceivers of the first type connected to the antennas of the first type are configured to operate in at least one of a Wideband Code Division Multiple Access (W-CDMA) system, a Global System for Mobile Communications (GSM) system, a General Packet Radio Service (GPRS) system, a High-Speed Circuit-Switched Data (HSCSD) system, a CDMA2000 system, an Evolution-Data Only (EV-DO) system, and a Worldwide Interoperability for Microwave Access (WiMAX) system.

11. A wireless telecommunications system comprising:
a plurality of base transceiver stations, each serving a plurality of remote subscriber units, each base transceiver station comprising:
one or more radio transceivers of a first type connected to an antenna of a first type, and configured to provide wireless access for the remote subscriber units;
a radio transceiver of a second type connected to an antenna of a second type;
a cable configured to connect the one or more radio transceivers of the first type to the transceiver of the second type in an intermediate frequency domain;
a carrier combiner unit configured to:
combine frequency carriers used by the one or more radio transceivers of the first type into one transport channel used by the transceiver of the second type; and
shift a frequency of the carriers used by the one or more radio transceivers of the first type with a different shift for each one of the carriers, wherein the frequency shift for an i-th carrier is $(i-1)\cdot df$, wherein i=1 . . . n, and n is the number of carriers to be combined, and wherein df is a basic frequency shift that is at least a width of the frequency carrier used by the one or more radio transceivers of the first type; and
at least one Radio Network Controller configured to control one or more of the plurality of base transceiver stations.

12. The wireless telecommunications system of claim 11 wherein the carrier combiner unit is built into the transceiver of the second type.

13. The wireless telecommunications system of claim 11 wherein the carrier combiner unit comprises an independent unit configured to receive input from the one or more radio transceivers of the first type, and to provide output to the transceiver of the second type.

14. The wireless telecommunications system of claim 11 wherein the basic frequency shift df is less than a width of the frequency carrier used by the one or more radio transceivers of the first type.

15. The wireless telecommunications system of claim 11 wherein the radio transceiver of the second type is configured to transmit and receive a signaling channel within the transport channel to provide information concerning point-to-point or point-to-multipoint radio power control, and carrier/noise ratio, to trigger an adaptive modulation.

16. The wireless telecommunications system of claim 11 wherein both the first and second types of radio transceivers are configured to use independent transmission power control.

17. The wireless telecommunications system of claim 11 wherein the radio transceiver of the second type is configured to operate in a point-to-point mode.

18. The wireless telecommunications system of claim 11 wherein the radio transceiver of the second type is configured to operate as a terminal in a point-to-multipoint mode.

19. The wireless telecommunications system of claim 11 wherein the radio transceiver of the second type is configured to operate in a meshed type mode.

20. The wireless telecommunications system of claim 11 wherein the one or more radio transceivers of the first type connected to the antennas of the first type are configured to operate in at least one of a Wideband Code Division Multiple Access (W-CDMA) system, a Global System for Mobile Communications (GSM) system, a General Packet Radio Service (GPRS) system, a High-Speed Circuit-Switched Data (HSCSD) system, a CDMA2000 system, an Evolution-Data Only (EV-DO) system, and a Worldwide Interoperability for Microwave Access (WiMAX) system.

21. A method of operating a base transceiver station serving a plurality of remote subscriber units in a wireless telecommunications system, wherein the base transceiver station comprises one or more radio transceivers of a first type connected to an antenna of a first type to provide wireless access for the remote subscriber units, and a radio transceiver of a second type connected to an antenna of a second type, the method comprising:
in the one or more radio transceivers of the first type:
down-converting radio-frequency signals to be transmitted to the radio transceiver of the second type into intermediate-frequency signals; and
up-converting intermediate frequency signals received from the radio transceiver of the second type into radio-frequency signals;
in the transceiver of the second type:
down-converting radio-frequency signals to be transmitted to the one or more transceivers of the first type into intermediate-frequency signals; and
up-converting intermediate frequency signals received from the one or more radio transceivers of the first type into radio-frequency signals;
combining frequency carriers used by the one or more radio transceivers of the first type into one transport channel used by the transceiver of the second type by shifting a frequency of carriers used by the one or more radio transceivers of the first type with a different shift for each carrier, wherein the frequency shift for an i-th carrier is $(i-1)\cdot df$ wherein i=1 . . . n, and n is the number of carriers to be combined, and df is a basic frequency shift that is at least a width of a frequency carrier used by the one or more radio transceivers of the first type; and
transmitting the radio-frequency signals and the intermediate frequency signals via one or more cables that connect the radio transceivers of the first and second types.

22. The method of claim 21 wherein df is less than a width of a frequency carrier used by the one or more radio transceivers of the first type.

23. The method of claim 21 wherein the radio transceiver of the second type transmits and receives a signaling channel within the transport channel to provide information concerning point-to-point or point-to-multipoint radio power control, and carrier/noise ratio, to trigger an adaptive modulation.

24. The method of claim 21 wherein both the first and second types of radio transceivers use independent transmission power control.

25. The method of claim 21 wherein the radio transceiver of the second type operates in a point-to-point mode.

26. The method of claim 21 wherein the radio transceiver of the second type operates as a terminal in a point-to-multipoint mode.

27. The method of claim 21 wherein the radio transceiver of the second type operates in a meshed type mode.

* * * * *

UNITED STATES PATENT AND TRADEMARK OFFICE
CERTIFICATE OF CORRECTION

Page 1 of 1

PATENT NO. : 8,229,347 B2
APPLICATION NO. : 12/304708
DATED : July 24, 2012
INVENTOR(S) : Fuss It is certified that error appears in the above-identified patent and that said Letters Patent is hereby corrected as shown below:

On the Title Page, in Field (57), under "ABSTRACT", in Column 2, Line 1, after "station", delete "(202)".

On the Title Page, in Field (57), under "ABSTRACT", in Column 2, Line 3, after "type", delete "(108)".

On the Title Page, in Field (57), under "ABSTRACT", in Column 2, Line 4, after "units", delete "(114)".

On the Title Page, in Field (57), under "ABSTRACT", in Column 2, Line 6, delete "type (206)." and insert -- type. --, therefor.

On the Title Page, in Field (57), under "ABSTRACT", in Column 2, Line 7, delete "cables (208)," and inset -- cables, --, therefor.

On the Title Page, in Field (57), under "ABSTRACT", in Column 2, Line 8, delete "10", before "frequency".

In Column 4, Line 9, delete "invention;" and insert -- invention; and --, therefor.

In Column 4, Line 14, delete "DESCRIPTION" and insert -- DETAILED DESCRIPTION --, therefor.

In Column 5, Line 14, delete "120°-sector" and insert -- 120° sector --, therefor.

In Column 6, Line 13, delete "Df" and insert -- df --, therefor.

In Column 6, Line 22, delete "formula" and insert -- formula: --, therefor.

Signed and Sealed this
Twentieth Day of November, 2012

David J. Kappos
*Director of the United States Patent and Trademark Office*